(Model.)
G. F. McINTOSH.
WATERING POT.
No. 245,194.     Patented Aug. 2, 1881.
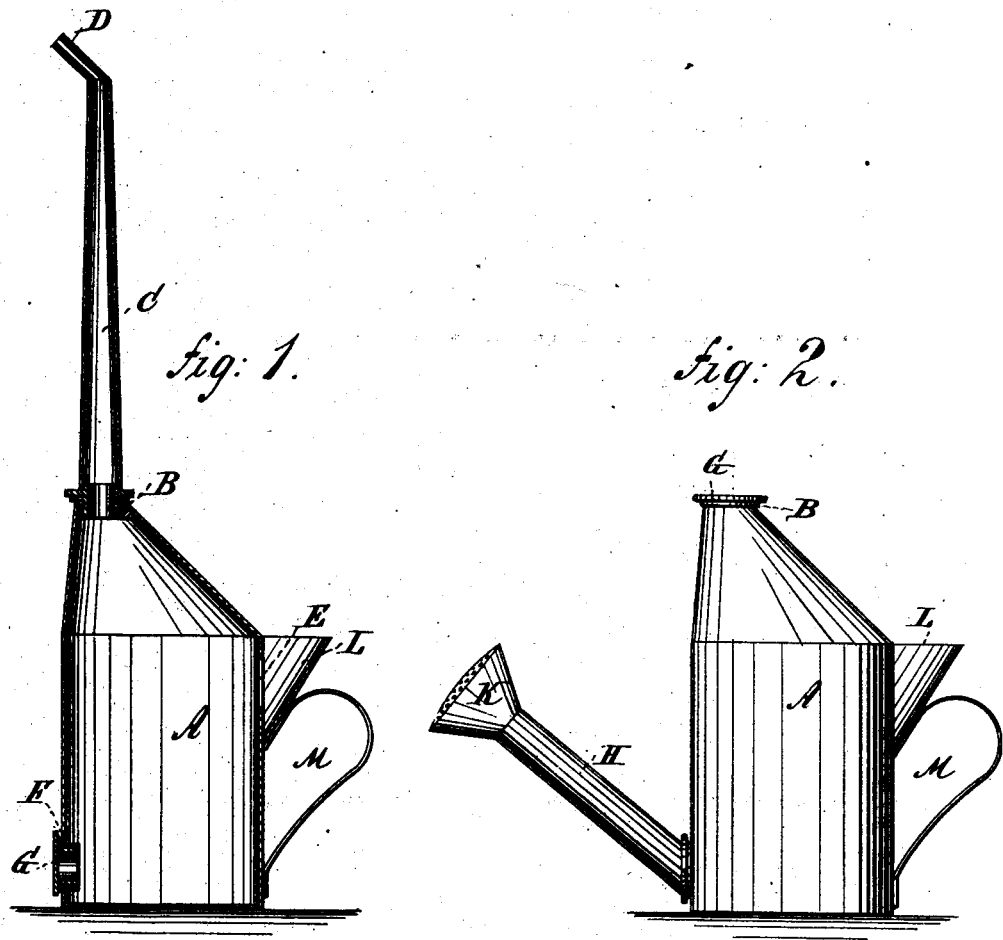
WITNESSES:
A. Schehl.
C. Sedgwick
INVENTOR:
G. F. McIntosh
BY Munn & Co
ATTORNEYS.

UNITED STATES PATENT OFFICE.

GEORGE F. McINTOSH, OF HALLOWELL, MAINE.

WATERING-POT.

SPECIFICATION forming part of Letters Patent No. 245,194, dated August 2, 1881.

Application filed December 31, 1880. (Model.)

*To all whom it may concern:*

Be it known that I, GEORGE FRANCIS McINTOSH, of Hallowell, in the county of Kennebec and State of Maine, have invented a new and Improved Watering-Pot, of which the following is a specification.

The object of my invention is to facilitate the convenient changing of the delivery-nozzles of the pot and prevent waste of water in supplying potted plants.

The invention consists in a watering-pot provided with a closed top, upper and lower orifices to receive changeable nozzles, and a filling aperture and funnel on the rear above the handle.

In the accompanying drawings, Figure 1 is a cross-sectional elevation of my improved watering-pot, showing the nozzle attached to the upper end of the same. Fig. 2 is a side elevation of the same, showing the upper aperture closed and the sprinkler attached to the bottom of the front.

Similar letters of reference indicate corresponding parts.

The upper part of the watering-pot A is contracted to form an aperture, B, at the extreme upper end, which aperture is threaded for the purpose of attaching a long nozzle, C, with a bend or inclined part, D, at the front end to the pot. The upper part of the pot A is preferably so contracted that the aperture B is near the front of the pot. The pot A is provided with an aperture, E, on the rear side for filling it with water, and a funnel-shaped cup, L, is attached to the pot around this aperture E to guide the water into it. The pot A is further provided with a screw-aperture, F, near the bottom of the front of the pot, and this aperture is closed by means of a screw-plug, G.

If the pot is to be used to water plants that cannot be reached conveniently—as, for instance, those in the rear rows of hot-houses—the pot is used with the nozzle C attached, as shown in Fig. 1; but if the leaves of plants are to be sprinkled, the pot is converted into an ordinary sprinkling-pot by removing the nozzle and closing the aperture B by means of the screw-plug G and screwing the spout H, provided with a sprinkler, K, at the front end, into the aperture F, as is shown in Fig. 2.

Having thus described my invention, I claim as new and desire to secure by Letters Patent—

As an improved article of manufacture, a watering-pot made, substantially as herein shown and described, with a closed top, with upper and lower apertures, B F, to receive changeable nozzles, and a filling aperture and funnel, E and L, in the rear side of the pot, above the handle M, as set forth.

GEORGE FRANCIS McINTOSH.

Witnesses:
 JOHN YOUNG,
 A. F. MORSE.